United States Patent [19]

Wang et al.

[11] Patent Number: 5,175,228

[45] Date of Patent: Dec. 29, 1992

[54] TWO-COMPONENT PRIMERLESS URETHANE-ISOCYANURATE ADHESIVE COMPOSITIONS HAVING HIGH TEMPERATURE RESISTANCE

[75] Inventors: Chia L. Wang, Hudson; Earl G. Melby, Uniontown; H. William Cocain, Cuyahoga Falls, all of Ohio

[73] Assignee: GenCorp Inc., Fairlawn, Ohio

[21] Appl. No.: 805,255

[22] Filed: Dec. 9, 1991

[51] Int. Cl.$^5$ .................... C08G 18/08; C08G 18/10
[52] U.S. Cl. ...................................... 528/48; 528/49; 528/50; 528/51; 528/905; 428/422.8; 524/706; 524/789
[58] Field of Search ............... 528/48, 49, 50, 51, 528/905; 428/422.8; 524/706, 789

[56] References Cited

U.S. PATENT DOCUMENTS

| | | | |
|---|---|---|---|
| 3,786,030 | 1/1974 | Rice | 528/49 |
| 3,980,594 | 9/1976 | Fabris et al. | 428/425 |
| 4,876,308 | 10/1989 | Melby et al. | 524/780 |
| 4,923,756 | 5/1990 | Chung et al. | 428/480 |
| 5,002,806 | 3/1991 | Chung | 528/60 |

OTHER PUBLICATIONS

T. M. Chapman; Journal of Polymer Sciences (1990) pp. 1473-1482, "Polyurethane Elastomers with Hydrolytic and Thermooxidative Stability" (I).
T. M., Chapman; Journal of Polymer Science; (1990) pp. 3685-3699, "Polyurethane Elastomers with Hydrolytic and Thermooxidative Stability" (II).
V. Gajewski; Sep., 1990, "Chemical Degradation of Polyurethane".
S. Foti; Journal of Polymer Science; 1981 pp. 1679-1687 "Mechanisms of Thermal Decomposition in Totally Aromatic Polyurethanes".
K. J. Voorhees; Journal of Polymer Science; 1978 pp. 213-228 "An Investigation of the Thermolysis Mechanism of Model Urethanes".
P. I. Kordomenos; Macromolecules; 1987; pp. 2077-2083 "Thermal Stability of Isocyanate-Based Polymers" (2).
P. J. Kordomenos; Macromolecules; pp. 1434-1437 "Thermal Stability of Isocyanate-Based Polymers" (1).
"Side Reactions in the Formation of Polyurethanes: Stability of Reaction pp. 509-522 Products of Phenyl Isocyanate" M. Spkirkova; Journal Macromolecular Science, 1990.
"Mechanism of Thermal Degradation of Polyurethanes Investigated by Direct Pyrolysis in the Mass Spectrometer" A. Ballistreri; Jrnl. of Polymer Science 1980.
E. Dyer; Journal of Polymer Science; 1964 pp. 1-14 "Thermal Degradation of N-Substituted Polycarbamates".
"Thermal Degration of the Polyurethane from 1,4-Butanediol and Methylene Bix(4-Phenyl Isocyanate)" N. Grassie; Journal of Polymer Science; 1978; pp. 1563-1574.

*Primary Examiner*—Maurice J. Welsh
*Assistant Examiner*—Rachel Johnson

[57] ABSTRACT

A two-component polyurethane composition has good shelf stability and the adhesive made by curing the same has good high temperature stability and no adhesion loss after high temperture bake. The base or prepolymer component containing a primary hydroxyl intermediate also has a sufficiently large excess of free isocyanate so that the ratio of free NCO groups in the prepolymer component to OH curative groups plus any amine groups in the curative component is generally from about 1.2 to about 2.0. The curative component contains a trimerization catalyst so that upon cure, isocyanurate units are produced. The system also contains molecular sieves, as well as phosphorous-type adhesion promoters.

37 Claims, No Drawings

TWO-COMPONENT PRIMERLESS URETHANE-ISOCYANURATE ADHESIVE COMPOSITIONS HAVING HIGH TEMPERATURE RESISTANCE

FIELD OF THE INVENTION

The present invention relates to a primerless, high temperature resistant urethane-isocyanurate adhesive composition made from a two-component, i.e., a prepolymer component and a curative component, system. The urethane system desirably contains trimerization catalyst, molecular sieves, and phosphorous type adhesion promoters.

BACKGROUND OF THE INVENTION

Urethane adhesives are used for bonding automotive fiberglass reinforced parts. Recent adhesives have been developed which have high bonding strength without the need for surface treatment of the fiberglass reinforced part as in U.S. Pat. No. 4,876,308. Such an adhesive in high temperature applications, e.g., paint bakes at temperatures of 400° F. (204° C.), degrades and results in fiberglass reinforced plastic assemblies having undesirable bond strength.

U.S. Pat. No. 4,876,308 to Melby et al. relates to a two-component type polyurethane adhesive for fiberglass reinforced plastics which requires no cleaning, preparation or treatment of the surface, and the like. The curative component is a nitrogen-free liquid polyether or polyester in an amount such that in association with a urethane prepolymer component containing free NCO groups, the ratio of the free NCO groups in the prepolymer component to the OH groups and NH groups in said curative component is at least 1.2 and desirably at least 1.35.

Thermal oxidative stability of polyurethane compositions at a high temperatures has been studied.

SUMMARY OF THE INVENTION

A two-part urethane system or composition generally contains a base or prepolymer component and a curative component. The prepolymer component contains a large excess of free isocyanate, that is NCO groups such as on one end of a reacted diisocyanate compound or polyisocyanates which are completely unreacted. The excess of the free isocyanate NCO groups to the total amount of hydroxyl terminated intermediate compounds of the urethane prepolymer component is generally an equivalent ratio of at least 2.0. The curative component contains a trimerization catalyst so that upon cure, isocyanurate groups are formed which impart high temperature stability to the formed urethane adhesive. The curative component also contains a phosphorous type adhesion promoter so that adhesion is maintained after exposure to high temperature. The system can also contain molecular sieves to improve the shelf life stability of the catalyst. Upon cure of the two-component system, a urethane adhesive is formed which has good high temperature stability, i.e. 193° C. or 204° C. for at least 60 or 70 minutes, and adhesion to primerless fiber reinforced plastics (FRP).

DETAILED DESCRIPTION OF THE INVENTION

The urethane system of the present invention is an uncured two part composition which contains a urethane prepolymer or base component and a curative component. The prepolymer component is made from a polyol intermediate and a large equivalent excess amount of a polyisocyanate so that free NCO groups exist. Such free NCO groups can exist on the ends of the urethane prepolymer or on unreacted polyisocyanates, etc. The prepolymer component can also contain various conventional additives or fillers discussed more fully herein below.

The polyol intermediate is generally a liquid polyether polyol or a polyester polyol, or combinations thereof, having primary hydroxy groups and having a number average molecular weight of from about 400 to about 10,000 and desirably from about 2,000 to about 9,000. A wide range of polyether or polyester polyols can be used in making the adhesives of the present invention such as diols, triols, tetrols, and the like.

Polyether polyols are generally made by reacting an alkylene oxide having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorhydrin using acid catalysts. Except for polyols made from ethylene oxide or polytetrahydrofuran, to obtain primary hydroxyl end groups, they are generally end capped with ethylene oxide. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines. Grafted polyether polyols such as those grafted with styrene or acrylonitrile can also be utilized. A preferred polyether intermediate is a polypropylene ether diol or triol containing primary hydroxyl end groups.

Polyethers having a highly branched chain are readily prepared from alkylene oxides and initiators having an active hydrogen functionality greater than two. The higher functional initiators that are useful with the alkylene oxides include polyols, polyamines and amino alcohols having a total of three or more reactive hydrogen atoms on hydroxyl and primary or secondary amino groups and generally having up to 12 carbon atoms. Suitable polyols include triols, such as glycerol, trimethylolpropane, butanetriols, hexanetriols, trialkanolamines, various diethylenetriamines, such as erythritol and pentaerythritol; pentols, hexols, such as dipentaerythritol and sorbitol; as well as alkyl glucosides, carbohydrates, polyhydroxy fatty acid esters such as castor oil; and polyoxy alkylated derivatives or polyfunctional compounds having three or more reactive hydrogen atoms, such as, the reaction product of trimethylolpropane, glycerol and other polyols with ethylene oxide, propylene oxide or other epoxides or copolymers thereof, e.g., copolymers of ethylene and propylene oxides, with ethylene oxide being used in a molar amount of not over 20 mol percent as compared to other alkylene oxides like propylene oxide. Examples of higher functional amino alcohols and polyamine initiators include ethanolamine, diethanolamine, triethanolamine, isopropanolamine, diisopropanolamine, triisopropanolamine, 2-(2-aminoethylamino)ethanol, 2-amino-2(hydroxymethyl)-1,3- propanediol, ethylenediamine, diethylenetriamine, triethylenetetramine, and urea as well as various aryl polyamines such as 4,4′,4″-methylidynetrianiline.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3′-thiodipropionic acid; succinic acid; adipic acid; malonic acid, glutaric acid, pimelic acid, sebacic acid, cyclohexane-1,2-dicarboxylic acid; 1,4-cyclohexadiene1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

In order to achieve specific properties which are influenced by the composition and content of polyurethane hard blocks, small amounts of polyhydric alcohols are optionally utilized in combination with the above-noted liquid polyether or polyester glycol intermediates. The polyhydric alcohols generally have from 2 to 15 carbon atoms with specific examples including ethylene glycol, 1,2-propylene glycol, 1,3-propylene glycol, 1,4-butane diol, 2,3-butane diol, 1,5-pentanediol, glycerol, sorbitol, pentaerythritol, dipropylene glycol, diethylene glycol, and the like. The amount of such polyhydric alcohols is generally from about 0 or 1 to about 40 parts by weight and preferably from about 0 or 1 to about 10 parts by weight based upon 100 parts by weight of the polyether polyol intermediate, the polyester polyol intermediate, or combinations thereof.

Polyesters from lactones (for example ε-caprolactone) and polyacetals, polycarbonates or polybutadienes containing terminal hydroxyl groups are also suitable.

Highly preferred polyol intermediates include polypropylene ether, and poly-1,2-butylene ether, which are end-capped so as to have primary hydroxyl end groups, as well as poly-1,4-tetramethylene ether, and epsilon-polycaprolactone diols.

The polyisocyanates which are utilized generally have the formula R(NCO)$_n$ where n is an integer of 2, 3 or 4 with approximately 2 being preferred. However, it is to be understood that since combinations of various polyisocyanates can be utilized, the equivalent amount of isocyanate can vary and often is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 15 carbon atoms being preferred, or combinations thereof. Aromatic diisocyanates and aliphatic substituted aromatic diisocyanates are desired since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane4,4′-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis(p-phenyl isocyanate). Examples of still other isocyanates include 1,5-naphthalenediisocyanate, cumene2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4′-diisocyanatodiphenylether, 4,4′-diphenyldi-isocyanate, 4,6-dimethyl-1,3-phenylenediisocyanate, 1,10-anthracenediisocyanate, 4,4′-diisocyanatodibenzyl, 3,3-dimethyl-4,4′-diisocyanatodiphenylmethane, 2,6-di-methyl-4,4′-diisocyanatodiphenyl and others and mixtures of the same. TDI is desirably utilized. The various diphenylmethane diisocyanates (MDI) and mixtures of MDI with polymeric MDI having an average isocyanate functionality of from about 2 to about 3.2 are preferred. Also useful are diisocyanates prepared by capping low molecular weight, that is less than 300, diols, ester diols or diamines with diisocyanates, such as the reaction products of one mole of 1,4-butanediol or bis(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used.

It is an important aspect of the present invention that free isocyanate, that is free NCO groups exist such as on the end of the prepolymer or on unreacted polyisocyanates, etc. Accordingly, the equivalent ratio of the amount of polyisocyanate utilized to make the prepolymer to the hydroxyl containing polyol intermediate (NCO/OH) is generally from about 2 to about 75 or 50, desirably from about 10 to about 40, and preferably from about 15 to about 35.

Various additives known to the art and to the literature are generally contained within the base of the prepolymer component in conventional amounts. Generally additives are utilized which impart desired properties to the adhesive such as various antioxidants, various ultraviolet light inhibitors, thickening agents, and the like. Various fillers can also be utilized in conventional amounts and the same are known to the art and to the literature. Examples of fillers which are general mineral, that is inorganic, and often in the powder form and which also serve to adjust the urethane prepolymer adhesive component viscosity include ground mica, talc, kaolin clay, calcium carbonate, calcium sulfite, colloidal silica, fumed silica, wollastonite, ballotini, hollow glass microspheres, glass, carbon and graphite fibers, various metallic oxides such as zinc, titanium zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 10 to about 50 parts by weight per 100 parts by weight of the prepolymer.

If it is desired that the polyurethane adhesive composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the various urethane reactions. The various pigments, dyes, etc., can also be utilized in either the prepolymer component, the curative component, or both.

The prepolymer component is generally made by adding the hydroxyl terminated polyol intermediate to a reactor along with the various other additives such as an antioxidant, a filler, and a shelf stabilizer if the same is utilized in the prepolymer component, and the like. The reactor contents are then generally heated with the various ingredients therein mixed and a vacuum applied to remove moisture. The one or more polyisocyanates are added after moisture has been removed. In the absence of a catalyst, the formation of the prepolymer generally occurs at an elevated temperature as from about room temperature to about 150° C. with the specific temperature depending upon the specific type of hydroxyl terminated polyol and the specific type of one or more polyisocyanates. If a urethane catalyst is contained in the prepolymer component, the prepolymer reaction will occur at a lower temperature.

The curative component generally contains a polyol curing agent which generally serves as a cross linking agent, a primary amine, and a trimerization catalyst. The polyol cross linking agent is generally free of nitrogen and can be the same as the intermediate polyol utilized to form the prepolymer. Hence, the above description of the intermediate polyol is hereby fully incorporated by reference. An essential requirement of the polyol is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a number average molecular weight of from about 400 to about 10,000, desirably 2,000 to 9,000, such as the various abovenoted polyol intermediates, or triols, tetrols, pentols, hexols, and the like, as noted above. A class of suitable polyols include the alkyl, aromatic, or alkyl substituted aromatic diols having from 2 to about 12 carbon atoms with from about 2 to about 8 carbon atoms being preferred. Another preferred class are the various polyhydric alcohols having from 3 to 15 carbon atoms and preferably from 3 to 10 carbon atoms and from 3 to 8 hydroxyl groups such as triols, tetraols, pentols, hexols, and the like with specific examples including glycerol, erythritol, pentaerythritol, arabitol, sorbitol, trimethylol propane, the various ethylene or propylene oxide adducts of trimethylol propane, glycerol, pentaerythritol, sorbitol, and the like. Still another class of nitrogen free curing agents are the various polyether polyols set forth hereinabove with regard to the intermediate and the same include polyether polyols which are grafted with styrene or acrylonitrile, methylacrylic nitrile, and the like. Although such polyol compounds have a nitrogen atom in the grafted portion of the polymer or oligomer, they are still within the definition of a nitrogen-free polyol curing agent of the present invention. Also included within the definition of polyols according to the concepts of the present invention are the various carbohydrates such as the various disaccharides and especially the monosaccharides, along with reaction products thereof with alcohols having from 1 to 5 carbon atoms such as for example alkyl glucoside, and the like. Examples of specific disaccharides include sucrose, lactose, and maltose. Examples of monosaccharides include the various pentoses such as arabinose, xylose, lyxose, ribose, as well as the various hexoses such as glucose, gulose, mannose, galactose, talose, allose, altrose, idose, fructose, sorbose, and the like. Of the various carbohydrates, the various alkyl glucosides with the alkyl group having from 1 to 12 carbon atoms are preferred.

Examples of preferred polyol crosslinking agents include ethylene or propylene oxide adducts of trimethylol propane, pentaerythritol, glycerol, alkyl glucosides, or carbohydrates, with the propylene oxide adduct of pentaerythritol being preferred.

The curative component also generally contains a primary aliphatic amine which typically provides sag resistance after the prepolymer component is mixed with the curative component. The primary amine can be a di or multifunctional primary amine having from about 1 to about 14 carbon atoms with from about 2 to about 8 carbon atoms being preferred. Examples of suitable primary amine compounds include diethylenetriamine, ethylenediamine, tetramethylenediamine, pentamethylenediamine, hexamethylenediamine, 2,5-diamine-n-hexane, xylene diamine, various naphthalene diamines such as 1,8-naphthalene diamine, and 1,3-diaminopropanol-2. The primary amine generally reacts with an equivalent amount of a free isocyanate group (NCO) in the prepolymer component to produce a polyurea. The reaction is generally very quick and the polyurea produced forms a strong hydrogen bonded network and significantly increases the viscosity of the mixed adhesive before cure and thereby provides sag resistance. An effective amount of the polyurea is thus utilized to prevent sag in the end product before cure thereof. Such an effective amount is generally from about 0.1 to about 5 parts by weight and preferably from about 0.5 to about 3 parts by weight per 100 parts by weight of the curative component.

An amount of the polyol curing or cross linking agent is utilized so that in association with the primary amine, the equivalent ratio of the free NCO groups of said prepolymer component to the curative OH +NH groups of the curative component is from about 1.2 to about 2.0, desirably from about 1.2 to about 1.6 and preferably from about 1.3 to about 1.5. The utilization of a high excess of polyisocyanate results in various groups in addition to urethanes such as allophanate, biuret, carbodiimide, and the like. Such a high equivalent range results in a cured polyurethane adhesive which has good adhesion to a FRP or metal substrate without the need of any surface pretreatment. That is, the surface is treatment-free. By the term "treatment-free" it is meant that the substrate such as the FRP or the metal need not be treated whatsoever (1) mechanically as by sanding, abrading, etc., (2) with a solvent such as methylene chloride, acetone, toluene, and the like, or (3) with a chemical treatment such as through the use of various primers, isocyanates, or amines. The formed adhesive is utilized to bond or adhere FRP to FRP, FRP to a metal, FRP to a painted metal, and FRP to various plastic substrates as for example polyurethane, polyurea, nylon, polydicyclopentadiene, molded epoxy, molded thermoplastic polyesters, and the like.

An important aspect of the present invention is the utilization of trimerization catalysts which have been found to impart improved high temperature stability to the urethane adhesive as during high temperature paint bake of fiberglass reinforced parts, and the like. Trimer catalysts generally include quaternary ammonium salts.

Generally numerous types of trimerization catalysts can be utilized. A suitable catalyst are the various amines of the general formula $$R^1-\underset{\underset{R^3}{|}}{N}-R^2$$

wherein $R^1$, $R^2$, and $R^3$, independently, is hydrogen or an alkyl having from 1 to 8 carbon atoms, or an aralkyl having a total of from 7 to 15 carbon atoms, with specific examples including $(C_2H_5)_3N$, $(CH_3)_2NCH_2C_6H_5$, and the like.

Another suitable trimerization catalyst are the various phosphines as generally represented by the formula $$R^4-\underset{\underset{R^6}{|}}{P}-R^5$$

where $R^4$, $R^5$ and $R^6$, independently, is an alkyl having from 1 to 8 carbon atoms, with specific examples including triethyl phosphine, trimethyl phosphine, and the like.

Still another suitable trimerization catalyst are the various alkoxides as generally represented by the formula $$R^7OM$$

where M is an alkali metal such as potassium, sodium, or lithium, or a borate, and $R^7$ is an alkyl having from 1 to 8 carbon atoms, with specific examples including $CH_3ONa$, $C_2H_5ONa$, and $C_4H_9OK$.

A still further suitable trimerization catalyst are the various metal oxides as generally represented by the formula $$MO$$

with a specific example being $Li_2O$.

Another suitable trimerization catalyst are the hydroxides of quaternary N,P,As,Sb, such as $C_6H_5CH_2N(CH_3)_3OH$, and the like.

Another suitable trimerization catalyst are the carboxylates as generally represented by the formula $$(R^8COO)_xM.$$

where M is K, Na, Ca, Fe, Mg, Hg, Ni, Co, Zn, Cr, Al, Sn, V, or Ti, where $R^8$ is H, an alkyl having from 1 to 10 carbon atoms, or an aryl alkaryl having from 6 to 15 carbon atoms and x is 1 to 6 with specific examples including $Ca(CH_3COO)_2$, $CH_3COOK$, $C_6H_5COONa$, $(C_3H_7COO)_4Ti$, $C_7H_{15}COOK$, and HCOONa.

Another suitable trimerization catalyst are various organometallics containing Zn, Si, Sn, Pb, or Sb, and O,N or S with specific examples including $R'_3Si-SR''$, $R'_3Sn-SR''$, $R'_3Sn-S-SnR''_3$, $R'_3n-OR''$, $R'_3Pb-NR''_2$, $R'_3Sb-(OR'')_2$, $R'_3Sb-(OCOR'')_2$, $R'Zn-OR''$, $R'Zn-NR''_2$, $(C_4H_9)_2S_nO$, and the like, where $R'$ and $R''$, independently, is an alkyl, an aryl, or an alkenyl group having a total of from 1 to about 15 carbon atoms.

Another suitable trimerization catalyst are the various metal chelates such as diethyldipyridylnickel, bis(dipyridyl)nickel, tetrakis(triphenylphosphine)nickel, and the like.

Another suitable trimerization catalyst are various hydrides such as $NaBH_4$ (sodium borohydride), $LiAlH_4$ (lithium aluminum hydride), sodium dihydrobis(2-methoxyethoxy)aluminum hydride, i.e.,

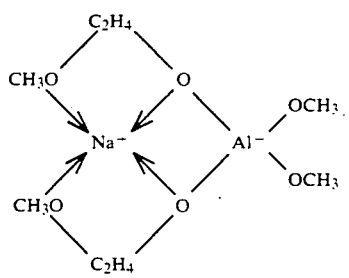

Another suitable trimerization catalyst are the various organic acids, inorganic acids, and Lewis acids, such as HCl, $(CO_2H)_2$, $AlCl_3$, and conventional Friedel-Crafts catalysts.

Another suitable trimerization catalyst are the various combination catalysts such as amines/epoxides, amines/alcohols, amines/alkylene carbonates, amines/alkylene imides, amines/carboxylic acids, amines/peroxides, ammonium hydroxides/carbamates.

Still another suitable trimerization catalyst are the a) sulfonium zwitterions as generally represented by the formula

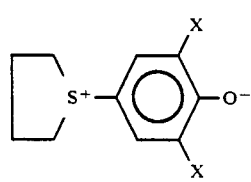

wherein X is H, Cl, an alkyl group having from 1 to 10 carbon atoms, and b) amine-imide zwitterions as generally represented by the formula

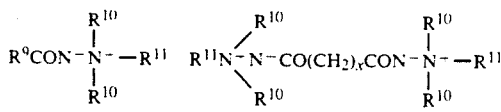

where x is from 2 to 16, $R^9$, and each $R^{10}$, independently, is an alkyl group having from 1 to 10 carbon atoms, and $R^{11}$ is $CH_2CH(OH)CH_3$, or $CH_2CH_2OH$.

Another suitable trimerization catalyst are the quaternary ammonium carboxylates as generally represented by the formula

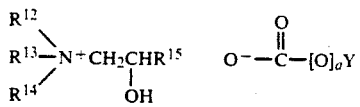

where a is 0 or 1, where $R^{12}$, $R^{13}$, $R^{14}$, independently, is alkyl or hydroxyalkyl of $C_{1-20}$, cycloalkyl of $C_{3-8}$, aralkyl, aryl, alkenyl of $C_{2-20}$, alkynyl of $C_{2-6}$, with alkyl $C_1$ to $C_4$ being preferred;

$R^{15}$ is H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, alkoxy alkyl of $C_{2-20}$, with alkyl $C_1$ to $C_4$ preferred, and where Y is H, alkyl of $C_{1-18}$, alkenyl of $C_{2-15}$, aromatic of $C_6$ to $C_{20}$ such as benzoate or methoxybenzyl, with alkyl $C_2$ to $C_{10}$ preferred.

A specific example of such a compound is TMR-2, manufactured by Air Products and Chemicals, Inc., which is trimethyl-2-hydroxypropyl ammonium 2-ethyl hexanoate. Related compounds include TMR, TMR-3, and TMR-4, wherein $R^{12}$, $R^{13}$ and $R^{14}$ is an alkyl independently having from 1 to 4 carbon atoms, $R^{15}$ is an alkyl having from 1 to 4 carbon atoms, and y is an alkyl having from 2 to 10, desirably 4 to 8 carbon atoms.

The quaternary ammonium carboxylates are preferred.

Other suitable trimerization catalysts include compounds such as 2,4,6 tris(dimethylaminomethyl)phenol
N,N'N''tris(dimethylkamniopropyl)sym-hexahydrotriazine.

Examples of desirable trimerization catalyst include benzyl trimethylammonium hydroxide, benzyl trimethylammonium methoxide, potassium acetate, potassium ethoxide, potassium octoate, potassium phthalimide, sodium dihydrobis (2-methoxy ethoxy) aluminum hydride, sodium ethoxide, sodium methoxide, 2,4,6 tris(-dimethylaminomethyl)phenol, N,N,'N''tris(dimethylaminopropyl)symhexahydrotriazine, trimethyl-2-hydroxypropyl ammonium 2-ethyl hexanoate (TMR-2), and similar tertiary amines such as TMR, TMR-3 and TMR-4, which are trade secrets of Air Products, and tetramethylammonium-2-ethyl hexoate (TMAO), with trimethyl-2-hydroxypropyl ammonium 2-ethyl hexanoate being highly preferred.

The amount of a trimerization catalysts is generally from about 0.01 to about 1.0 percent by weight, desirably from about 0.02 to about 0.50 percent by weight, and preferably from about 0.05 to about 0.5 percent by weight based upon a total weight of the cure component.

The use of a urethane catalyst, which is generally a liquid, is optional. In combination with the trimerization catalysts, described above, urethane catalysts are desirably used to adjust open time or pot life of mixed adhesives. Typically, when a urethane catalyst is utilized, it is desirably utilized in the curative component, although it can also be utilized in the prepolymer component, or in both components. Suitable urethane catalysts include various tin catalysts known to the art and to the literature such as various stannous carboxylates such as stannous acetate, stannous octoate, stannous laurate, stannous oleate, and the like; or dialkyl tin salts of carboxylic acids such as dibutylin diacetate, dibutyltin dilaurate, dibutyltin maleate, dibutyltin disulfide, dibutyltin di-2-ethylhexoate, dilauryltin diacetate, dioctyltin diacetate, or the like. Also, trialkyltin hydroxide, dialkyltin oxide, or dialkyltin chloride can be utilized. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts by weight of the component in which it is utilized such as the curative component. The tertiary amine catalysts, when utilized, can be used in amounts of 0.01 to about 5 parts by weight per 100 parts by weight of the component in which it is utilized such as the curative component. However, at least 0.01 part of at least one type of catalyst should be present. In addition to the above catalysts, organomercury or organic bismuth compounds can be utilized wherein the organic portion is an aliphatic and preferably an alkyl having from 2 to 20 carbon atoms. The amount is generally from about 0.01 to about 1.0 parts by weight per 100 parts by weight of the prepolymer or curative component.

In addition to the above compounds of the curative component, optionally a generally small portion of the hydroxyl-terminated polyol intermediate utilized in the prepolymer component can also be contained within the curative component in an amount such that the total weight of the curative component is generally equal or relatively similar to the total weight of the prepolymer component. This aspect is for ease of application and ease of combining equal weight volumes of the two components in order to aid the individual workers in mixing and combining the components and the application thereof. Of course, it is to be understood that generally any weight ratio of the curative component to the urethane prepolymer component can be utilized so long as the equivalent ratio of free NCO groups in the prepolymer component to curative OH and NH groups of the curative component is within the above set forth ranges, and that the ratio of free NCO groups to the total OH groups of said hydroxy-terminated polyol intermediate, regardless of its location, is as set forth hereinabove.

Another important aspect of the present invention is that the two part urethane system contains a shelf life stabilizer so that generally the urethane catalyst and/or the trimerization catalyst are maintained in the stable condition. Generally, the shelf life stabilizer is desirably contained in the curative component although it can also be contained in the prepolymer component or both. A suitable shelf life stabilizer includes various molecular sieves such as crystalline potassium, sodium, or calcium aluminosilicates, various potassium, sodium, or calcium aluminophosphates, and the like. A specific example is Sylosiv 4Å, an approximately 4Å sodium, calcium, or potassium aluminosilicate molecular sieve available from W. R. Grace Company. The amount of such shelf stabilizers is generally from about 0.1 to about 15.0 percent by weight and preferably from about 0.5 to about 10 percent by weight based upon the weight of the curative component or system, or the prepolymer component or system.

Another important aspect of this invention is the use of various phosphorus-type adhesion promoters which can be utilized in the curative component, although the same can be contained in the base component, or both, to prevent adhesion loss after the urethane adhesive is applied to a substrate or part which is subjected to high temperature bake as for example temperatures up to about 400° F. (204° C.) for 1 hour. The phosphorous type compounds are generally liquid and include various compounds which can be represented by the following formula

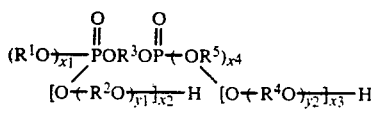

where $R^1$, $R^3$, $R^5$, independently, is an alkyl having from 1 to 15 carbon atoms, wherein $R^2$ and $R^4$, independently, is an alkyl having from 1 to 6 carbon atoms, where $y_1$ or $y_2$, independently, is from 0 to 20, and wherein $x_1 + x_2 = 2$, wherein $x_3 + x_4 = 2$; and wherein $x_1$, $x_2$, $x_3$, or $x_4$ is 0, 1, or 2. A specific example of such a compound is Vircol-82 manufactured by Allbright and Wilson Corporation and has the formula

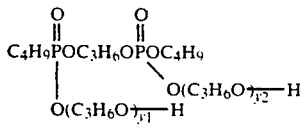

having a molecular weight of about 548 and $y_1 + y_2 = 3.4$. Another phosphorous type compound can be represented by the formula

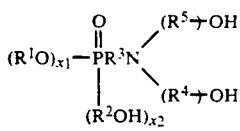

wherein $R^1$, $R^2$, $R^3$, $R^4$, and $R^5$, independently, is an alkyl having from 1 to 15 carbon atoms, where $x_1 + x_2 = 2$, and $x_1$ and $x_2$, independently, is 0, or 2. A specific example of such a compound is Fyrol-6 which is manufactured by the Akzo Chemicals, Inc. Corporation and has the formula

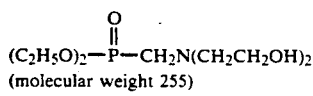
(molecular weight 255)

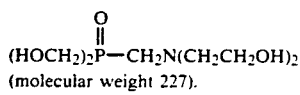
(molecular weight 227).

Another phosphorous type adhesion promoter is represented by the formula

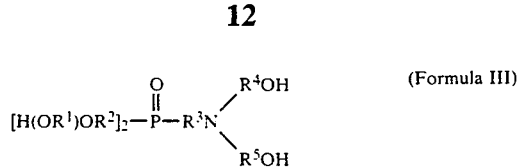

wherein $R^1$, $R^2$, $R^4$, and $R^5$, independently, is an alkyl having from 1 to 8 carbon atoms, and $R^3$ is an alkyl having 1 to 8 carbon atoms. A specific example is

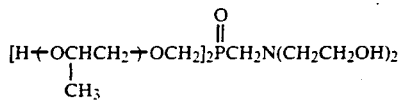

Yet another type of a phosphorous type adhesion promoter is represented by the formula

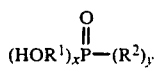

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x + y = 3$. Specific examples include

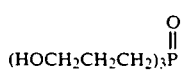

The amount of the phosphorous-containing compounds is generally from about 0.1 to about 15 percent by weight and preferably from about 0.5 to about 10 percent by weight based upon the total weight of the curative component or system, or from about 0.05 to about 7.5 percent by weight and preferably from about 0.25 percent to about 5 percent by weight based upon the total weight of the curative component and the prepolymer component.

As with the urethane prepolymer component, the curative component can contain various additives, pigments, dyes, fillers, and the like. Often such compounds can be utilized solely in either component, or in both components. Generally, the curative component contains significant amounts of fillers as described with regard to the urethane prepolymer component and is thus hereby fully incorporated with specific examples including talc, clay, silica, calcium carbonate, and the like. Moreover, fumed silica is often utilized in order to prevent the fillers from settling out. Various pigments and or dyes can be utilized such as those discussed hereinabove with regard to the urethane prepolymer component. Additionally, various additives depending upon desired end use can also be contained within a curative component such as antioxidants, and the like. The amount as well as the type of specific fillers, additives, etc., are well known to the art and to the literature inasmuch as they are generally the same utilized in urethane compounds or adhesives.

The various ingredients of the curative component can be generally added in any manner and mixed therewith. Inasmuch as many of the ingredients of the curative component are liquid such as the cross linking agent, the primary amine, the trimerization catalyst, the phosphorous type adhesion promoter, and if used in the curative component, the urethane catalyst. The curative component is generally a liquid and thus various non-liquid ingredients such as pigments can be readily blended therein.

The two components of the two part urethane system of the present invention are separately maintained until it is desired that a urethane adhesive be made. The urethane adhesive is made by blending the two components together utilizing any conventional mixer or blender, etc., and heating to cure the two-component system and form the urethane adhesive. The cure temperature will vary depending upon the types of ingredients of each component, but generally is from about 150° F. to about 300°, and preferably from about 200° to about 250° F. with mixing time being generally rather small, for example, as on the order of less than 10 minutes and often from about 1 to 4 minutes.

In actual use, the two components are generally mixed together and applied to a non-treated or surface treatment free substrate, that is a primerless substrate such as the above-noted FRP substrates, metal substrates, plastic substrates, and the like with the substrates heated to cure the system in the presence thereof and form an in situ adhesive which often bonds two substrates together to form a urethane adhesive composite. The two-component system and urethane adhesive of the present invention is particularly suitable for use in the automotive industry wherein FRP structural and appearance grade components are bonded together such as automotive hoods, doors, fenders, front ends, trunk lids, body panels, and the like.

The present invention will be better understood by reference to the following examples which serve to illustrate the invention, but not to limit the same.

EXAMPLES

All parts set forth in the examples are by weight unless otherwise indicated.

EXAMPLE 1

A polyurethane prepolymer was prepared using the following procedure: polypropylene ether triol capped with ethylene oxide, 6000-7000 molecular weight (PPG 3025) (29 parts), antioxidant (0.4 parts), and fumed silica (0.5 parts) were charged to a clean, dry reactor.

The reactor and its contents were heated with stirring to 110° C. During the heating cycle, powdered talc (13.5 parts) and molecular sieves (5 parts) were added. The reactor was heated to 70°-110° C. under vacuum (26 inches mercury) for 2 hours. Then, 52 parts of liquid methylene bis (4-phenylisocyanate) (isocyanate 2191, Modified MDI, manufactured by Dow) was added. The contents of the reactor were mixed for 2 hours at 60°-110° C. The NCO content of the final product is 3.5 meq/gm and the viscosity was 4,000-8,000 cps (Brookfield). The adhesive base was used in all subsequent experiments.

EXAMPLE 2

A polyurethane curative was prepared using the following procedure: A polypropylene ether triol with 21 weight percent grafted acrylonitrile (34 parts), polypropylene ether tetrol of 500 molecular weight (PEP-550, manufactured by Dow) (28.5 parts), phthalocyanine blue (0.7 parts), naphthalene diamine (1.0 parts), fumed silica (0.4 parts), and phosphorus containing polyol Vircol-82 (8.0 parts) were charged to a clean, dry reactor, the reactor was heated to 110° C. while adding powdered talc (30-40 parts). The slurry was heated at 70°-110° C. under vacuum for 2 hours. Then, tin catalyst (0.1-1 parts) was added. The final mixture was stirred and cooled to 30° C. It had a viscosity of 15,000-30,000 cps (Brookfield). This curative was used with the adhesive base described in Example 1 at a base/curative mix ratio of 1/1 to form the final polyurethane adhesive.

EXAMPLE 3

For testing of adhesive strength, standard lap shear specimens were prepared using the procedure: Polyurethane adhesive was mixed from the components described in Example 1 and 2 using adhesive meter-mixing equipment (Model MVR-28, Liquid Control Corp.) equipped with a static type mixing head. A bead of mixed adhesive was applied along one side of FRP plaque. The plaque was placed in the aluminum fixture and a second plaque was aligned on top of the adhesive bead to give a final specimen 6'×6' with a 1'×6' overlap bonded area.

The aluminum fixture gave a standard 0.3" bond line thickness. The fixture with the bonded sample was placed on the hot press at 121° C. for 4 minutes to cure the adhesive. The final specimens were placed in an air circulating oven at 150° C. for 30 minutes to ensure complete cure. The lap shear adhesive samples were tested using standard Instron type testing equipment with a cross-head speed of 0.5"/minute.

EXAMPLE 4

Example 2 was repeated except the addition of Dabco TMR-2 (a tertiary amine/glycol blend manufactured by Air Products, Co.) catalyst (0.3 parts).

EXAMPLE 5

Example 2 was repeated except the addition of Dabco TMR (Quarternary ammonium salt in ethylene glycol solvent, manufactured by Air Products, Co.) catalyst (0.08 parts).

EXAMPLE 6

Example 2 was repeated except the addition of Dabco TMR catalyst (0.09 parts) and molecular sieves (0.5 parts).

TABLE I

| | Lap Shear Strength at 82° C. | | | |
|---|---|---|---|---|
| Example | 2 (Control) | 4 | 5 | 6 |
| Post-cure 193° C., 70 Min. | 426.8 psi 72 SF | 339.1 psi 100 SF | 477.3 psi 100 SF | 423.9 psi 100 SF |
| Post-cure 204° C., 60 Min. | Degradation | 299.4 psi 99 SF/1CF | 434.9 psi 86 SF/11CF | 453.1 psi 96SF/4CF |

SF = substrate failure, CF = cohesive failure. SMC 7113 were used.

Example 2 is a urethane adhesive which shows thermal decomposition during ELPO oven bake (204° C., 60 minutes). High retention of adhesive strength after exposure to 193° C. for 70 minutes and 204° C. for 60 minutes was observed for compositions made from Examples 4-6 which contained trimerization catalysts (TRM or TMR-2). Comparing Example 2 to Examples 4–5 shows that trimerization catalysts further improve the thermal stability of adhesives made using a polyurethane prepolymer made from the primary hydroxyl capped polyol.

COMPARATIVE EXAMPLE 1

An adhesive base was made utilized the procedure of Example 1. Composition of the base was as follows:

TABLE II

| Adhesive Base | |
|---|---|
| Ingredient | Grams |
| Polypropylene Ether Diol, PPG 3025 | 39.48 |
| Wing-Stay S (Antioxidant) | 0.40 |
| Powdered Talc | 23.20 |
| Isonate 2191 (Modified MDI) | 33.92 |
| Sylosiv 120 (Powdered Molecular Sieves 4Å) | 3.00 |

A masterbatch of the curative was made and the composition is set forth in Table III.

TABLE III

| (Adhesive Curative | |
|---|---|
| Ingredient | Grams |
| Polypropylene Ether Tetrol, PEP-550 | 62.5 |
| Phthalocyanine Blue | 1.5 |
| 1,8-Naphthalene Diamine | 1.0 |
| Powdered Talc | 35.0 |

To 100 grams of the curative of Table III was added DABCO TRM-2, a quarternary ammonium salt in the amount of 0.8 grams and Dabco T-12, dibutyltindilaurate in the amount of 0.05 grams. The resultant curative was mixed with the base of Table II at an NCO-/OH+NH ratio of 1.35 using the laboratory scale mixer. The composition was heated for 1 hour at 204° C. A lap shear strength at 82° C. of 74 psi (100 percent adhesion failure) was obtained. Examination of the sample showed that the adhesive was severely degraded by the thermal treatment.

This data shows that trimerization catalyst was not effective in increasing thermal stability of an adhesive made from a polyol with mostly secondary hydroxyls (PPG3025).

EXAMPLE 7

Example 2 was repeated except the addition of Dabco TMR catalyst (0.08 parts) and molecular sieves (1.3 parts).

EXAMPLE 8

Example 2 was repeated except that tin catalyst was replaced with Dabco TMR catalyst (0.09 parts) and molecular sieves (1.3 parts).

EXAMPLE 9

Example 2 was repeated except that tin catalyst was replaced with Dabco TMR-2 catalyst (0.03 parts) and molecular sieves (1.3 parts).

EXAMPLE 10

Example 2 was repeated except the addition of Dabco TMR-3 catalyst (0.27 parts) and molecular sieves (1.3 parts).

EXAMPLE 11

Example 2 was repeated except the addition of Dabco TMR-4 catalyst (0.19 parts) and molecular sieves (1.3 parts).

EXAMPLE 12

Example 2 was repeated except that tin catalyst was replaced with tetramethylammonium-2-ethyl hexoate (0.28 parts) and molecular sieves (1.3 parts).

TABLE IV

| Effect of Various Trimerization Catalysts on High Temperature Resistance Lap Shear Strength @ 82° C. | | | | | | |
|---|---|---|---|---|---|---|
| Ex. | 7 | 8 | 9 | 10 | 11 | 12 |
| Post-cure 193° C., 70 Min. | 450 psi 99SF/1CF | 460 psi 99SF | 464 psi 95SF/1CF | 481 psi 97SF/1CF | 520 psi 82SF/7CF | 471 psi 35SF/23CF |
| Post-cure 204° C., 60 Min. | 507 psi 93SF/6CF | 466 psi 99SF/1CF | 406 psi 95 SF/4CF | 473 psi 94SF/4CF | 423 psi 61SF/21CF | 380 psi 41SF/25CF |

The effect of a trimerization catalyst on high temperature resistance is given in Table IV. As apparent from Table IV, the use of different types of trimerization catalysts generally resulted in good high heat stability as indicated by high values of substrate failure.

EXAMPLE 13

Following the procedure of Example 2, a different curative was made using a polypropylene ether triol with 21 weight percent grafted acrylonitrile (35 parts), polyether tetrol of 500 molecular weight (29 parts), phthalocyanine blue (0.7 parts), naphthalene diamine (1.0 parts), fumed silica (0.4 parts) powdered talc (34 parts), tin catalyst (0.03 parts), and Dabco TMR-2 catalyst (0.23 parts).

EXAMPLE 14

Example 13 was repeated except the addition of phosphorus containing polyol Vircol-82 (8 parts).

TABLE V

| Effect of Phosphorous-Containing Polyol Vircol-82 on High Temperature Resistance Lap Shear Strength at 82° C. | | |
|---|---|---|
| Example | 13 | 14 |
| Post-cure 193° C., 70 Min. | 570 psi 81SF | 513 psi 92SF |
| Post-cure 204° C., 60 Min. | 346 psi 4SF/70CF | 378 psi 68SF/6CF |

The effect of a phosphorus type adhesion promoter with regard to high temperature resistance is in Table V.

EXAMPLE 15

Example 13 was repeated except that TMR-2 catalyst was replaced with TRM catalyst (0.19 parts).

EXAMPLE 16

Example 13 was repeated except that TMR-4 catalyst was replaced with TMR catalyst (0.04 parts) and molecular sieves (4.2 parts).

EXAMPLE 17

Example 13 was repeated except that TMR-2 catalyst was replaced with TMR catalyst (0.08 parts) and 5 parts molecular sieves.

TABLE VI
EFFECT OF MOLECULAR SIEVES ON SHELF LIFE STABILITY OF CURATIVES

| Example | 15 | 16 | 6 | 7 | 17 |
|---|---|---|---|---|---|
| Molecular sieves in Curative | None | Yes | Yes | Yes | Yes |
| Initial Reactivity* | 5.12 Min. | 5.9 Min. | 10.8 Min. | 11.45 Min. | 6.25 Min. |
| Reactivity* After Heat Aging, 54° C., 3 Days | 9.85 Min. (+92.4%) | 4.45 Min. (−24.5%) | — | — | — |
| Reactivity* After Heat Aging, 54° C., 5 Days | — | — | 9.6 Min. (−11.1%) | — | 5.25 Min. (−16%) |
| Reactivity* After Heat Aging, 70° C., 2 Days | — | — | 8.8 Min. (−18.5%) | — | 5.3 Min. (−15.2%) |
| Reactivity* After Heat Aging, 70° C., 4 Days | — | — | — | 19.8 Min. (+72.9%) | — |

*Reactivity - time to 1,000,000 cps Brookfield Spindle #7, 140 grams of mixed adhesive.

The effect of shelf life stabilizing agents with respect to the curatives is shown in Table VI. Examples 6, 7, 16, and 17 which contained powedered molecular sieves had good shelf life stability as shown by its activity after heat aging. In contrast, Example 15 without molecular sieves which contained both tin and trimerization catalyst lost reactivity very quickly.

Each of the curatives was mixed with adhesive base (Example 1) and gel times as measured by the time for mixed adhesive to reach $1 \times 10^6$ cps was determined.

While in accordance with the Patent Statues, the best mode and preferred embodiment has been set forth, the scope of the invention is not limited thereto, but rather by the scope of the attached claims.

What is claimed is:

1. A two-component urethane system, comprising: a urethane prepolymer component and a curative component, said urethane prepolymer component made from a primary hydroxyl terminated intermediate and a polyisocyanate, the amount of said polyisocyanate being an equivalent ratio of at least 2.0 based upon the hydroxyl terminated intermediate so that said prepolymer component has free NCO groups, said curative component comprising a nitrogen-free polyol curing agent, a primary polyamine, and a trimerization catalyst, the equivalent ratio of said free NCO groups to said curative hydroxyl groups and amine groups of said curative component being at least 1.2 and effective adhesion promoting amounts of a phosphorus adhesion promoter.

2. A two-component urethane system according to claim 1, wherein said trimerization catalyst is an amine, a phosphine, an alkoxide, a metal oxide, hydroxides of quaternary N, P, As, Sb, metal carboxylates, organometallics, metal chelates, hydrides, acids, combination catalysts, zwitterions, quaternary ammonium carboxylates, 2,4,6 tris(dimethylaminomethyl)phenol, or N,N',N"tris(dimethylaminopropyl)sym-hexahydrotriazine, or combinations thereof, and wherein the amount of said trimerization catalyst is from about 0.01 to about 1.0 percent by weight based upon the total weight of said curative component.

3. A two-component urethane system according to claim 2, wherein said hydroxyl terminated intermediate has a number average molecular weight of from about 400 to about 10,000, and wherein the amount of said polyisocyanate to said hydroxyl terminated intermediate is an equivalent ratio of from about 2.0 to about 50.

4. A two-component urethane system according to claim 3, wherein said equivalent ratio of said polyisocyanate to said hydroxyl terminated intermediate is from about 10 to about 40, and wherein said phosphorus adhesion promoter is

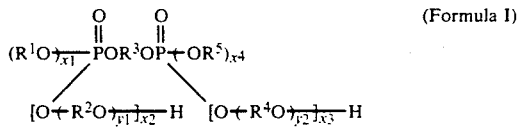
(Formula I)

where $R^1$, $R^3$, $R^5$, independently, is an alkyl having from 1 to 15 carbon atoms, wherein $R^2$ and $R^4$, independently, is an alkyl having from 1 to 6 carbon atoms, where $y_1$ or $y_2$, independently, is from 0 to 20, and wherein $x_1 + x_2 = 2$, wherein $x_3 + x_4 = 2$; and wherein $x_1$, $x_2$, $x_3$, or $x_4$ is 0, 1, or 2 or

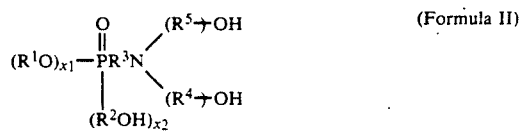
(Formula II)

wherein $R^1$, $R^2$, $R^3$, $R^4$, and $R^5$, independently, is an alkyl having from 1 to 15 carbon atoms, where $x_1 + x_2 = 2$, and $x_1$ and $x_2$, independently, is 0, or 2 or

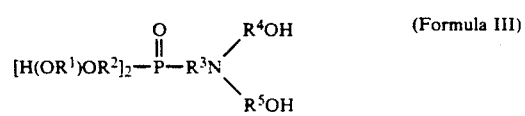
(Formula III)

wherein $R^1$, $R^2$, $R^4$, and $R^5$, independently, is an alkyl having from 1 to 8 carbon atoms, and $R^3$ is an alkyl having 1 to 8 carbon atoms or

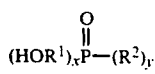 (Formula IV)

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$.

5. A two-component urethane system according to claim 4, wherein said polyisocyanate is an aromatic containing polyisocyanate having a total of from 6 to about 20 carbon atoms, and wherein said nitrogen free polyol curing agent has a number average molecular wight of from about 400 to about 10,000.

6. A two-component urethane system according to claim 5, wherein said trimerization catalyst is benzyl trimethylammonium hydroxide, benzyl trimethylammonium methoxide, potassium acetate, potassium ethoxide, potassium octoate, potassium phthalimide, sodium dihydrobis(2-methoxy ethoxy)aluminum hydride, sodium ethoxide, sodium methoxide, 2,4,6 tris(-dimethylaminomethyl)phenol, N,N',N''tris(dimethylaminopropyl)symhexahydrotriazine, trimethyl-2-hydroxypropyl ammonium 2-ethyl hexanoate or similar tertiary amines, or tetramethylammonium-2-ethyl hexoate, or combinations thereof, wherein the amount of trimerization catalyst is from about 0.05 to about 0.50 percent by weight based upon the total weight of said cured component, wherein the equivalent ratio of said free NCO groups to said hydroxyl groups of said curing agent and said amine groups of said curative component is from about 1.2 to about 1.6, and wherein the amount of said primary amine is from about 0.1 to about 5 parts by weight for every 100 parts by wight of said crosslinking agent.

7. A two-component urethane system according to claim 6, wherein said primary hydroxyl terminated intermediate has a number average molecular weight of from about 2,000 to about 9,000.

8. A two-component urethane system according to claim 7, wherein said polyisocyanate is toluene diisocyanate, diphenylmethane diisocyanate, or polymeric MDI, or mixtures thereof, and wherein the equivalent ratio of said polyisocyanate to said hydroxyl terminated intermediate is from about 15 to about 35, and wherein the amount of said phosphorus adhesion promoter is from about 0.25 to about 5 percent by weight based upon the total weight of the two component urethane system.

9. A two-component urethane system according to claim 8, wherein said trimerization catalyst is

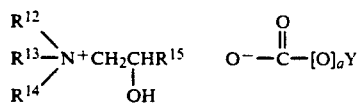

wherein $R^{12}$, $R^{13}$, and $R^{14}$, independently is an alkyl having from 1 to 4 carbon atoms, wherein $R^{15}$ is an alkyl having from 1 to 4 carbon atoms, and wherein a is 0 or 1 and y is an alkyl having from 2 to 10 carbon atoms, or tetramethylammonium-2-ethyl hexoate, and wherein said equivalent ratio of said free NCO groups to said hydroxyl groups and said amine groups of said curative is from about 1.3 to about 1.5, and wherein said adhesion promoter is

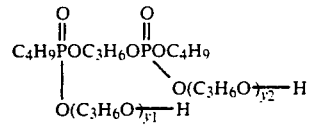

having a molecular weight of about 548 and $y_1 + y_2 = 3.4$,

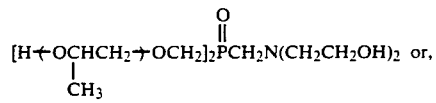

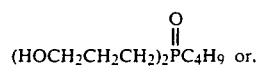

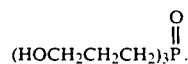

10. A two-component urethane adhesive according to claim 1, including an effective amount of a molecular sieve to provide good shelf stability to said system.

11. A two-component urethane adhesive according to claim 4, including an effective amount of a molecular sieve to provide good shelf stability to said system.

12. A two-component urethane adhesive according to claim 7, including from about 0.1 percent by weight to about 15 percent by weight of a molecular sieve based upon the total weight of said curative component and said prepolymer component.

13. A two-component urethane adhesive according to claim 9, including from about 0.5 to about 10 percent by weight of a potassium, sodium, or calcium aluminosilicate or of a potassium, sodium, or calcium aluminophosphate based upon the total weight of said curative component and prepolymer component.

14. A urethane adhesive composition, comprising:
a urethane adhesive, said urethane adhesive being the reaction product comprising a two-component system of a urethane prepolymer competent and a urethane curative component, said urethane prepolymer component made from a primary hydroxyl terminated intermediate and a polyisocyanate, the equivalent ratio of said polyisocyanate to said hydroxyl terminated intermediate being from about 2 to about 75 so that said prepolymer component contains free NCO groups, and a urethane curative component, said urethane curative component comprising a nitrogen free polyol curative heaving hydroxyl groups therein, a primary polyamine containing amine groups therein, and a trimerization catalyst, the equivalent ratio of said free NCO groups to said hydroxyl groups of said polyol curative and said amine groups of said primary polyamine being at least 1.2, and from about 0.05 to about 7.5 percent by weight of a phosphorus adhesion promoter based upon the total weight of the curative component and the prepolymer component.

15. A urethane adhesive composition according to claim 14, wherein said equivalent ratio of said polyisocyanate to said hydroxyl terminated intermediate is from about 10 to about 40, and wherein said phosphorous adhesion promoter is

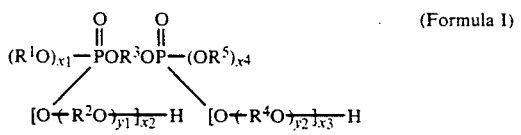  (Formula I)

where $R^1$, $R^3$, $R^5$, independently, is an alkyl having from 1 to 15 carbon atoms, wherein $R^2$ and $R^4$, independently, is an alkyl having from 1 to 6 carbon atoms, where $y_1$ or $y_2$, independently, is from 0 to 20, and wherein $x_1+x_2=2$, wherein $x_3+x_4=2$; and wherein $x_1$, $x_2$, $x_3$, or $x_4$ is 0, 1, or 2 or

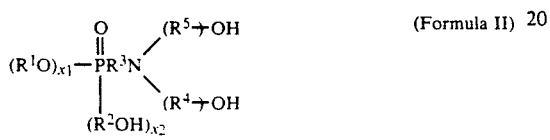  (Formula II)

wherein $R^1$, $R^2$, $R^3$, $R^4$, and $R^5$, independently, is an alkyl having from 1 to 15 carbon atoms, where $x_1+x_2=2$, and $x_1$ or $x_2$ is 0, 1, or 2 or

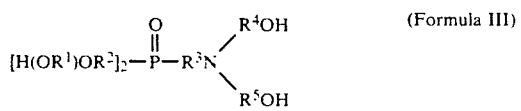  (Formula III)

wherein $R^1$, $R^2$, $R^4$, and $R^5$, independently, is an alkyl having from 1 to 8 carbon atoms, and $R^3$ is an alkyl having 1 to 8 carbon atoms or

  (Formula IV)

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$.

16. A two-component urethane system according to claim 15, wherein said polyisocyanate is an aromatic containing polyisocyanate having a total of from 6 to about 20 carbon atoms, and wherein said trimerization catalyst is benzyl trimethylammonium hydroxide, benzyl trimethylammonium methoxide, potassium acetate, potassium ethoxide, potassium octoate, potassium phthalimide, sodium dihydrobis(2-methoxy ethoxy)aluminum hydride, sodium ethoxide, sodium methoxide, 2,4,6 tris(dimethylaminomethyl)phenol, N,N',N''tris(dimethylaminopropyl)symhexahydrotriazine, trimethyl-2-hydroxypropyl ammonium 2-ethyl hexanoate or similar tertiary amines, or tetramethylammonium-2-ethyl hexoate, or combinations thereof, wherein the amount of trimerization catalyst is from about 0.02 to about 0.50 percent by weight based upon the total weight of said cured component, wherein the equivalent ratio of said free NCO groups to said hydroxyl groups and said amine groups of said curative component is from about 1.2 to about 1.6, and wherein the amount of said primary amine is from about 0.1 to about 5 parts by weight for every 100 parts by wight of said polyol curing agent, and wherein said nitrogen free polyol curing agent has a number average molecular weight of from about 400 to about 10,000.

17. A urethane adhesive composition according to claim 16, wherein said primary hydroxyl terminated intermediate has a number average molecular weight of from about 400 to about 10,000, and wherein the amount of said phosphorus adhesion promoter is from about 0.25 to about 5 percent by weight based upon the total weight of the two component urethane system, and wherein said trimerization catalyst is

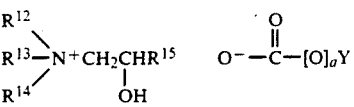

wherein $R^{12}$, $R^{13}$, and $R^{14}$, independently, is an alkyl having from 1 to 4 carbon atoms, wherein $R^{15}$ is an alkyl having from 1 to 4 carbon atoms, and wherein a is 0 or 1 and y is an alkyl having from 2 to 10 carbon atoms, or tetramethylammonium-2-ethyl hexoate.

18. A urethane adhesion composition according to claim 17, wherein said polyisocyanate is toluene diisocyanate, diphenylmethane diisocyanate, or polymeric MDI, or mixtures thereof, and wherein the equivalent ratio of said polyisocyanate to said hydroxyl terminated intermediate is from about 15 to about 35, and where said phosphorus adhesion promoter is

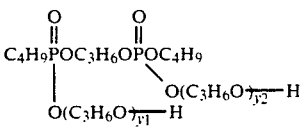

having a molecular weight of about 548 and $y_1+y_2=3.4$,

 or

 or

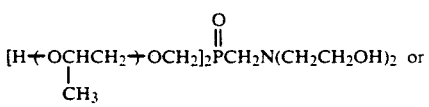 or

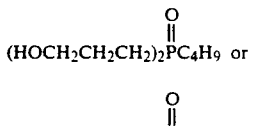

19. A urethane adhesive composition according to claim 14, including an effective amount of a molecular sieve to provide good shelf stability to said system.

20. A urethane adhesive composition according to claim 16, including from about 0.1 percent by weight to about 15 percent by weight of a molecular sieve based upon the total weight of said curative component and said prepolymer component.

21. A urethane adhesive composition according to claim 18, including from about 0.5 to about 10 percent by weight of a potassium, sodium, or calcium aluminosilicate or of a potassium, sodium, or calcium aluminophosphate based upon the total weight of said curative component and prepolymer component.

22. A urethane adhesive composite containing at least two surface treatment-free substrates therein, said surface treatment-free substrates bonded together by the urethane adhesive of claim 14.

23. A urethane adhesive composite containing at least two surface treatment-free substrates therein, said surface treatment-free substrates bonded together by the urethane adhesive of claim 15.

24. A urethane adhesive composite containing at least two surface treatment-free substrates therein, said surface treatment-free substrates bonded together by the urethane adhesive of claim 16.

25. A urethane adhesive composite containing at least two surface treatment-free substrates therein, said surface treatment-free substrates bonded together by the urethane adhesive of claim 17.

26. A urethane adhesive composite containing at least two surface treatment-free substrates therein, said surface treatment-free substrates bonded together by the urethane adhesive of claim 18.

27. A urethane adhesive composite containing at least two surface treatment-free substrates therein, said surface treatment-free substrates bonded together by the urethane adhesive of claim 19.

28. A urethane adhesive composite containing at least two surface treatment-free substrates therein, said surface treatment-free substrates bonded together by the urethane adhesive of claim 20.

29. A urethane adhesive composite containing at least two surface treatment-free substrates therein, said surface treatment-free substrates bonded together by the urethane adhesive of claim 21.

30. A composite according to claim 22, wherein each said substrate is an FRP.

31. A composite according to claim 24, wherein each said substrate is an FRP.

32. A composite according to claim 26, wherein each said substrate is an FRP.

33. A composite according to claim 28, wherein each said substrate is an FRP.

34. The urethane adhesive composition of claim 14 which has a 204° C. temperature resistance for 1 hour.

35. The urethane adhesive composition of claim 16 which has a 204° C. temperature resistance for 1 hour.

36. The urethane adhesive composition of claim 18 which has a 204° C. temperature resistance for 1 hour.

37. The urethane adhesive composition of claim 20 which has a 204° C. temperature resistance for 1 hour.

* * * * *